May 19, 1942. W. W. CRILEY 2,283,416
APPARATUS FOR FORMING METAL ARTICLES
Filed March 15, 1940 4 Sheets-Sheet 1

INVENTOR.
WILLIAM W. CRILEY
BY
HIS ATTORNEY.

INVENTOR.
WILLIAM W. CRILEY
BY
John H. Leonard,
HIS ATTORNEY.

May 19, 1942. W. W. CRILEY 2,283,416
APPARATUS FOR FORMING METAL ARTICLES
Filed March 15, 1940 4 Sheets-Sheet 3

INVENTOR.
WILLIAM W. CRILEY
BY
HIS ATTORNEY.

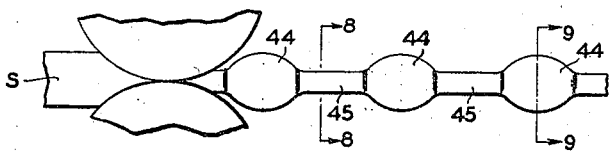
Fig.8   Fig.7   Fig.9
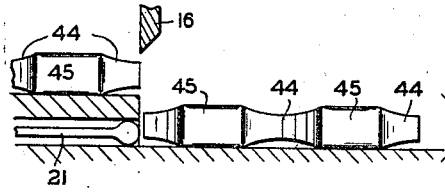
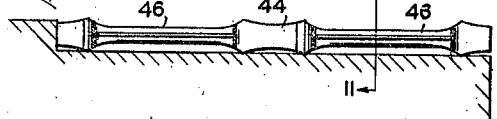
Fig.10
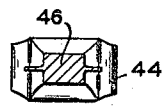
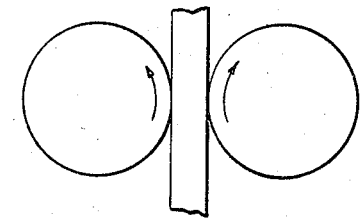
Fig.11
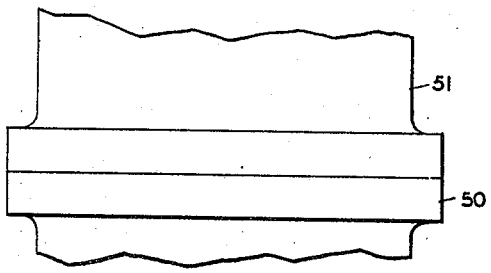
Fig.12
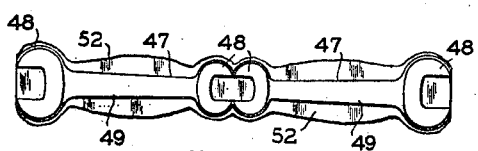
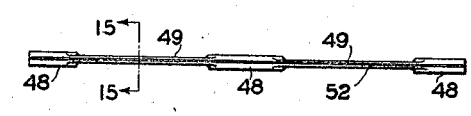
Fig.13   Fig.14
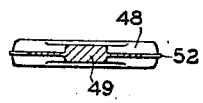
Fig.15
INVENTOR.
WILLIAM W CRILEY
BY
HIS ATTORNEY.

Patented May 19, 1942

2,283,416

UNITED STATES PATENT OFFICE 2,283,416

APPARATUS FOR FORMING METAL ARTICLES

William W. Criley, Cleveland, Ohio

Application March 15, 1940, Serial No. 324,161

4 Claims. (Cl. 80—3)

This invention relates generally to apparatus for forming metal articles from bar stock, in which the final shape is imparted to a partially formed heated blank by an impression die forging or pressing operation.

One of the principal objects of the present invention is to predistribute the metal in bar stock, or in a partially formed blank, more effectively preparatory to the impression die forging or pressing operation, so that the different portions of the resultant blank correspond more nearly in size and shape to the impression die cavity portions which they will occupy during the impression die pressing or forging operation, whereby complete filling of all portions of the impression die cavity with a minimum of resultant flash metal results.

A correlative and equally important object is to cut off heated bar stock or blanks at accurately located portions and immediately thereafter to preform the stock or a blank, preparatory to the impression die forging or pressing operation, in such manner that the severed stock or blank can be subjected to the latter operation while it retains sufficient heat, whereby reheating of the stock between the preforming and impression die pressing, or forging, operations is unnecessary.

Another object is to cut off bar stock, or blanks of a series of connected irregularly contoured blanks, accurately, then immediately to advance the cut-off stock or blank toward cooperating roll dies and then either positively to effect entry of the stock or blanks accurately between the dies at the instant that the die cavities register or to move the stock or blank into a position such that it will be grasped by the dies and drawn therebetween when the die cavities subsequently come into registry.

Another object is to provide the combination with a roll die forging machine, of a cut off mechanism and a feed mechanism, both of which are driven in accurately timed relation to the die rolls and in which the feed mechanism is operative to cut off bar stock or blanks in advance of the rolls and then, while holding the cut off stock or blank in proper alignment, either to advance it to and positively push it between the rolls at the instant of registry of the die cavities or to advance the cut-off stock or blank into a position wherein it comes to rest and will be grasped by the dies and drawn therebetween when the cavities come into registry subsequent to the positioning of the blank or stock.

An object which is particularly applicable to partially formed, irregularly contoured blanks connected together in a series, is to cut off the blanks successively and accurately from the series at a location which is determined by gauging of the blank position from a predetermined and accurately preformed portion of each succeeding blank, preferably near the relatively trailing portion thereof in the direction of travel, and then roll die forging the severed blank so as to predistribute the already partially distributed metal preparatory to the impression die forging or pressing operation so that the metal is more nearly in the theoretically correct relation to the corresponding portions of the impression die cavity in which the blank is to be given its final configuration, as a result of which the blank can be made to fill the impression die cavity completely and without the production of as great an amount of flash as usually results from impression die pressed or forged articles formed from blanks which have been subjected only to a single preforming operation.

A correlative object is to cut off such irregularly contoured heated blanks in the manner described and then feed the severed blanks between roll dies in accurate registry with the die cavities while constraining the blanks to a position in which the application of rolling pressure is angularly disposed to, and preferably 90° about, the longitudinal axis of the blanks from the direction of application of the pressure applied in the preceding preforming operation.

An equally important object is to overcome the difficulties heretofore present in the roll die forging of previously irregularly contoured connected blanks by a method in which the error in the length of the preformed blanks is prevented from being accumulative but is compensated for, and by which the blanks effect better registry with the die cavities of the roll dies.

Other objects and advantages will become apparent from the following specification wherein reference is made to the drawings, in which:

Fig. 7 is a diagrammatic elevation of a pair of roll dies with a piece of bar stock passing therethrough and partially formed thereby in accordance with the prior art;

Figure 1:
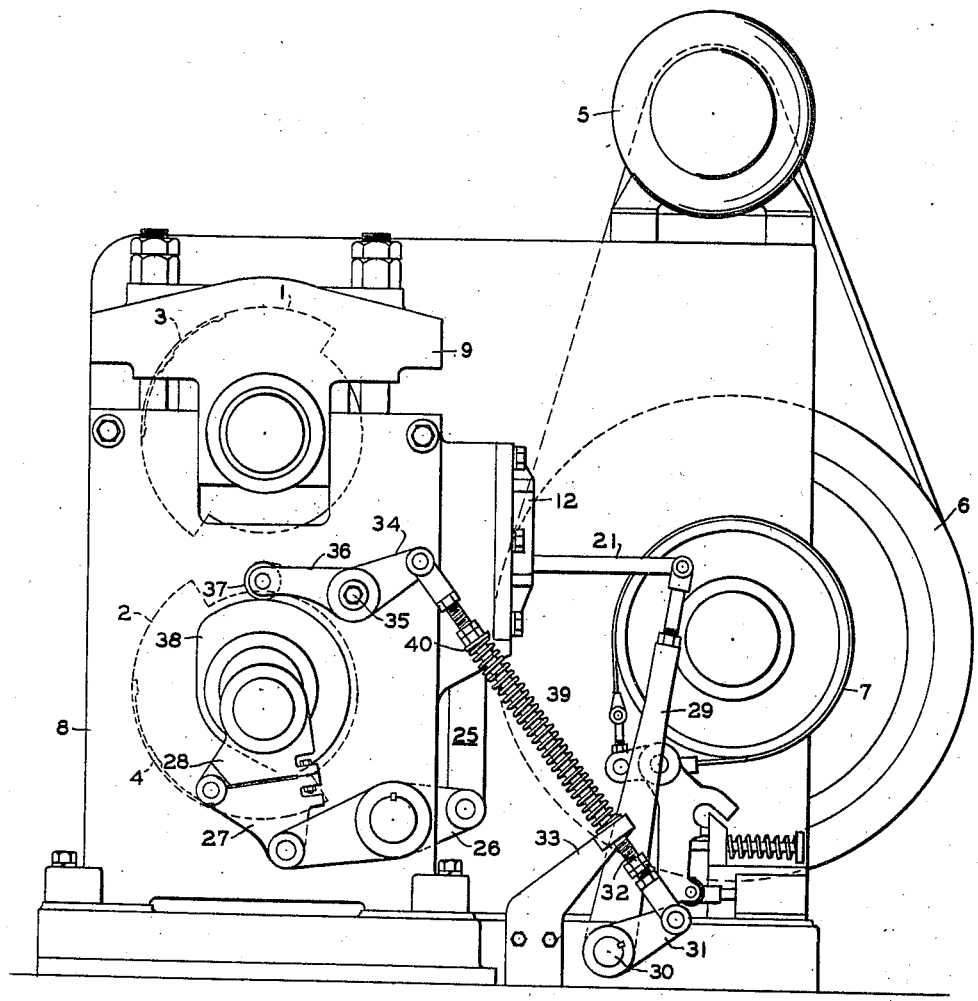
Fig. 1 is a side elevation of an apparatus embodying the principles of the present invention.

Figs. 8 and 9 are cross sectional views of the partially formed blank illustrated in Fig. 7 and are taken on the planes indicated by the lines 8—8 and 9—9 in Fig. 7;

Fig. 10 is a diagramamtic illustration of the present apparatus and illustrates successive operations on the blanks and stages of formation of the blank passing therethrough;

Fig. 11 is a cross sectional view of the blank after passage through the apparatus of the present invention, and is taken on the line 11—11 in Fig. 10;

Fig. 12 is a diagrammatic illustration of an impression forging die and hammer for imparting the final contour of the article;

Fig. 13 is a plan view of the blank as finally formed in the impression die;

Fig. 14 is a side elevation of the finally formed blank illustrated in Fig. 13, and Fig. 15 is a cross sectional view taken on the line 15—15 in Fig. 14.

For the purposes of illustration, the method and apparatus of the present invention are described hereinafter both as applied to ordinary bar stock which is of substantially uniform cross section throughout its length and as applied to blanks which are irregularly contoured and are connected together to form a series of blanks each of which may be finally formed into a single article or a plurality of articles which are connected together by the usual gating flash and the like.

Before describing the present method and apparatus which is equally applicable to bar stock or the irregularly contoured blanks, certain prior practices in connection with the formation of the latter should be noted.

Such connected blanks usually are formed from rod or bar stock by passing the stock in heated condition through roll forging dies and thereby forging the stock into a series of connected blanks of irregular contour, the irregular contour of which is generally in the nature of bulges and flattened portions of predetermined relation to each other and which are successively recurrent throughout the series in some definite sequence. As mentioned, each blank may be for one or more finished articles, depending generally on the size and shape of the blank required, a blank being considered the length of the preformed stock that is finally formed in a single impression die forging or pressing operation. After the roll die forging operation, the blanks are severed from others in the series and forged into final form between impression dies by an impression die pressing or forging operation. However, only limited predisposition of the metal near the locations desired for the final impression die forging operation is obtained by the single pass of the stock through the roll forging die with the result that the impression die often is not completely filled or an excessive amount of flash is produced on the finished article.

Unsuccessful attempts have been made heretofore to subject the series of irregularly contoured, connected blanks to a second roll die forging operation, but inaccuracies in the series of partially formed irregularly contoured connected blanks prevent proper registry of many of the blanks of the series with the dies of the rolls. The inaccuracies result from the first die rolling operation because the amount of drawing, forming and shaping of the bar stock varies at different portions due to the changes and workability of the metal at different temperatures, grain structure, localized conditions and the like.

Since it has proven unsatisfactory to subject the series of irregularly contoured connected blanks to a second roller die forging operation, and since the predistribution of metal obtained in most instances in a single roller die forging operation is not all that is to be desired, attempts have been made to pass the series of irregularly contoured connected blanks which have been produced by the first roller die forging operation between cylindrical rolls which have no die cavity. In this latter practice, the series of blanks, during its passage between the cylindrical rollers, is held in a position such that the direction of application of the rolling pressure is ninety degrees about the axis of the series of blanks to the direction of application of the pressure applied by the roll dies in the first operation.

By the introduction of this intermediate step, some lengthening of the blank and slightly better distribution of the metal can be obtained accompanied by a resultant decrease in the amount of flash material in the finally formed articles, whereas very little lengthwise flowing of the metal can be obtained by the impression dies. Certain limitations, however, are imposed by the fact that this second die rolling operation is performed with smooth or cylindrical rollers having no die cavity. The first die rolling operation usually is such as to flatten or reduce the thickness of portions of the stock in the direction of application of pressure with resultant bulging of the stock in a direction at ninety degrees thereto at such locations. Consequently, if the irregularly contoured stock is passed through smooth rollers in a position in which the application of pressure is at ninety degrees to the direction at which it was applied in the die rolling operation, the decrease in thickness in the direction of applied pressure either is limited to the original thickness of the bar stock or thickness of the thickest portion of the blank in the direction of applied pressure.

Another disadvantage of the method just described arises in connection wth the rolling of either plain bar stock or a connected series of partially formed blanks. In both instances, each portion of the entire length of stock, or each blank of the series, cools for a period equal to the time required for rolling the entire length or series. In addition, the cooling time of a greater portion of the lengths or blanks is additionally increased due to the time required to sever the blanks or lengths of stock from each other between the roll forging operation and the impression die pressing or forging operation. This accumulated cooling time is such that the method just described can be practiced only if the bar stock or series of blanks is reheated between the final impression die forging or pressing operation and the immediately preceding roll forging operation. By the present method and apparatus, this heating step is eliminated as no greater time is required to sever the stock and then subject it to the roll forging operation than was required by the prior methods wherein it was subjected to the roll forging operation while unsevered, yet by the present method and apparatus no delay occurs and resultant cooling between the impression die pressing or forging operation and the immediately preceding roll forging operation is eliminated.

A preferred form of apparatus for performing the method herein described is illustrated in the drawings and comprises cooperating segmental die rolls 1 and 2 which are of the construction generally employed for die rolling operations.

The rolls are provided with dies 3 and 4, respectively, which have cavities of the proper shape to impart to the material passed therebetween an irregular contour as distinguished from the regular contour surfaces imparted by ordinary smooth or cylindrical forging rolls which have no die cavities.

The rolls may be driven from a source of power, such as the motor 5, through any suitable driving connection which, in the form illustrated, includes a belt driven fly wheel 6 drivingly connected to the roll 2 in the customary manner and provided with a brake 7 for stopping the rolls at a predetermined relatively rotated position. The rolls 1 and 2 are drivingly connected to each other so that the die cavities of the rolls are maintained in the proper registry with each other. The rolls may be mounted for relative adjustment in the plane of their axes in a suitable upright frame 8, preferably by mounting the upper roll 1 rotatably in a vertically adjustable support 9.

At the feed side of the rolls, a shear and roll guide member 10 is rigidly secured on the frame 8. The guide member 10 has a plurality of horizontal guide troughs 11, each of which is open in the outer face of the member opposite from the rolls, and extends inwardly and entirely through the member 10 with its inner open end adjacent to the roll throat so that stock or blanks moved lengthwise along the troughs toward the rolls enter the rolls in the right direction and at the right elevation. Since both troughs 11 are identical in form and function, and merely are aligned with different die cavities of the roll dies, one only, and its cooperating elements, is referred to specifically hereinafter. On the outer face of the guide member 10 is a plate 12 which has feed passages 13 which generally are horizontal and positioned above the bottom of the troughs 11, respectively, for affording access to the troughs.

Fixedly secured to the plate 12 is a stationary shear blade 14, the blade 14 being positioned with its cutting edge at the lower limit of the passage 13. A movable shear 15, having a blade 16 for cooperation with the blade 14, is mounted for vertical reciprocation in suitable guideways formed by and between the guide member 10 and the plate 12. The reciprocation of the shear 15 is such that the cutting edge of the blade 16 is raised at each return stroke to a position above the upper limit of the port 13. Due to the position of blades and downward shearing stroke, stock or blanks extending through the passage 13 inwardly of the guide member 10 are sheared off and caused to drop downwardly to the bottom of the trough 11.

A suitable end stop 17 for gauging the length of the plain bar stock S inserted through the port 13 is mounted in the guide member 10 in alignment with the port 13. Suitable adjustment for the stop 17 is provided by elongated slots 18 in the upper wall of the guide member 10 and bolts 19 which are received through a flange of the stop 17 and the slots 18. Thus, the stop may be secured fixedly at different distances from the port 13.

Figure 2:
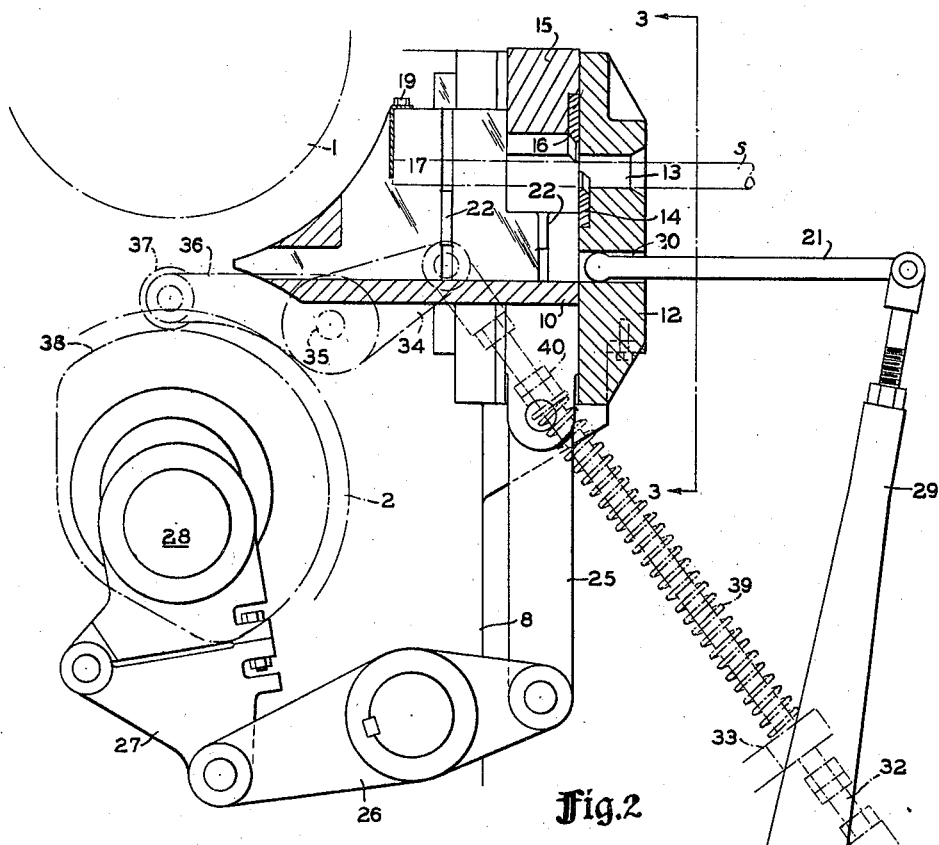
Fig. 2 is an enlarged fragmentary side elevation, partly in section, illustrating in greater detail the roller dies, feeding mechanism and cut off mechanism of the apparatus illustrated in Fig. 1.
Figure 3:
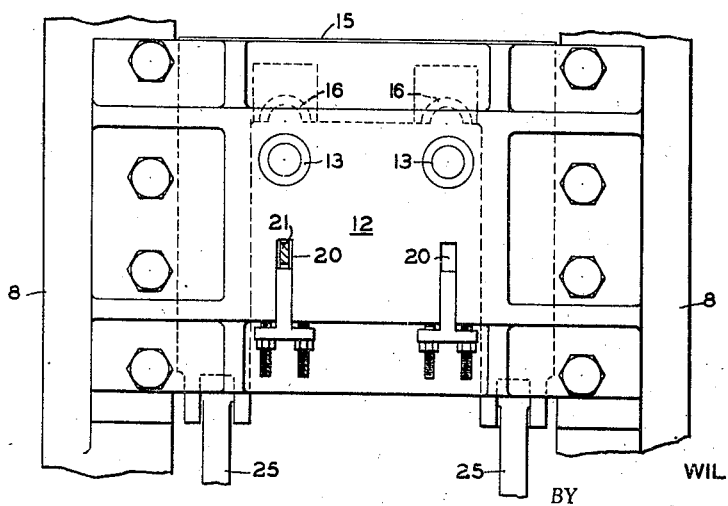
Fig. 3 is an enlarged fragmentary end elevation of the structure illustrated in Fig. 2 as viewed from the line 3—3 in Fig. 2.
Figure 4:
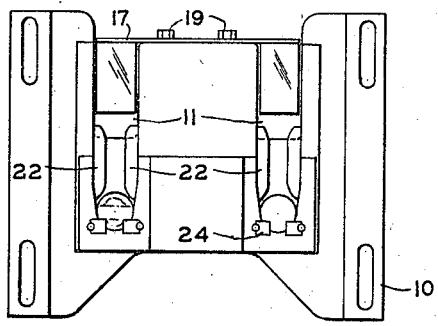
Fig. 4 is a right end elevation of the shear and roll guide of the apparatus illustrated in Fig. 2.
Figure 5:
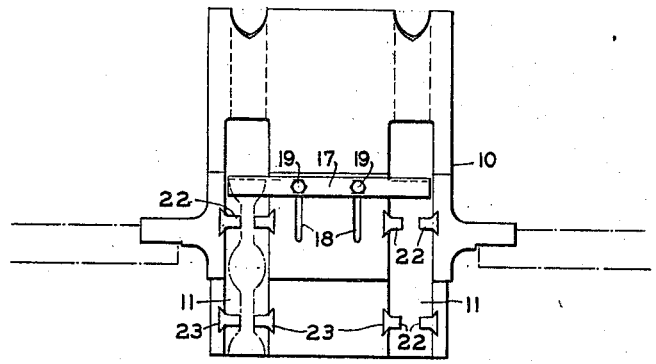
Fig. 5 is a top plan view of the shear and roll guide illustrated in Fig. 4.

In the plate 12, in axial alignment with the bottom portion of the trough 11, is a passage or port 20 through which extends a reciprocable push rod 21 of a feeding mechanism. The push rod 21 occupies a withdrawn position wherein its innermost end is within the port 20, as illustrated in Fig. 2, as the shear operates to shear off a blank and the severed blank, or length of stock, drops into a horizontal position in the bottom of the trough 11. The push rod is actuated in accurately timed relation to the operation of the rolls and shear so that after the blank has reached the position described, the push rod engages it and moves it endwise toward the rolls and accurately into position for proper engagement thereby, either prior to or at the instant that the die cavities 3 and 4 are in proper position and registry for its reception. In those instances in which irregularly contoured blanks are to be fed to the rolls, removable vertical guides 22 of the desired shape for the particular blank to be roll forged may be provided. In the form illustrated, the guides 22 are mounted in vertical slots in the guide member 10 and fixedly held in position and proper alignment therein by dovetail sliding connections, as indicated at 23. The guides 22 are positioned to engage laterally narrow portions of the blank and they terminate a sufficient distance above the bottom of the trough 11 so that wider portions of the blank which are spaced endwise from the narrower portions may pass therebeneath as the blank is moved along the trough. Likewise, horizontal guides 24 which extend lengthwise along the trough 11 may be provided if desired, or required, for the particular blank being formed. The guides 22 and 24 are shaped and located so as to constrain the blank to the relatively rotated position about its own axis in which it lies at the instant it is sheared or, in event it is slightly rotated out of such position, to rotate it back into position for passing in proper registry into the cavities of the forging roll dies.

In order to reciprocate the shear 15 it is connected by a link 25 to one end of a rocker arm 26, the other end of which in turn, is connected by a safety link 27 to a crank 28. The crank 28 is mounted on and is rotatable with the stub shaft or trunnion of the segmental roll 2. If desired, the crank 28 may be made adjustable with respect to the roll 2 so as to provide adjustable timed relation between the shear operation and the rotation of the rolls.

As heretofore explained, the push rod 21 must be driven in accurately timed relation to the rolls 2 and 3 so as to introduce or position the blank properly for the desired registry. In order to drive the push rod in the manner described, it is pivotally connected at its outer end to one end of a rocker arm 29 which is fixedly mounted on a rockable shaft 30. The shaft 30, in turn, is mounted to rock in the frame 1. A rocker arm 31 is fixedly mounted on the shaft 30 and at its outer end is pivotally connected to one end of an extensibly adjustable link 32. The link 32 extends loosely through a suitable abutment 33 which is rigid with the frame 1. The other end of the link 32 is pivotally connected to one arm 34 of a bell crank which is pivotally mounted on the frame of the apparatus by a pivot or rock shaft 35. The other arm 36 of the bell crank carries a cam roller 37 which is in rolling engagement with the periphery of a cam 38. The cam 38 is mounted for rotation with the forging roll 2 and preferably is adjustable circumferentially so as to time the operation of the push rod and its operating mechanism with respect to the operation of the rolls and, in combination with the extensible link 32, to make possible adjustment of the push rod operation to conform to changes in the dies or length of the blanks to be forged, and to make possible either the pushing of the blank positively between the rolls at the instant of registry of the die cavities or the positioning of the blank so that it will be grasped and drawn between the rolls at a subsequent revolution of the rolls.

The cam roller 37 is maintained in firm engagement with the cam 38 by a compression spring 39 which is operatively interposed between the stationary abutment 33 and a suitable adjustable abutment 40 on the link 32, so that the compression of the spring can be varied. The spring 39 drives the push rod on its feeding stroke and thus introduces the cut-off blank between the rolls, or positions the blank before registry of the die cavities so that the rolls themselves will grasp the blank and draw it therebetween when the cavities subsequently register.

Figure 6:
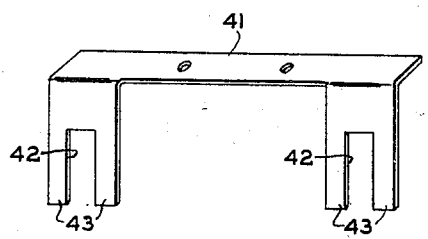
Fig. 6 is a perspective view of a modified form of gauging stop which is used in the present invention.

When irregularly contoured blanks are to be passed through the apparatus, an end stop such as 17 which merely engages the leading end of the stock cannot be used for gauging as such would still be subject to the accumulative error in the lengths of the blanks in the series. In order to eliminate the accumulation of error, the stop 17 is replaced with a stop 41 which is illustrated in Fig. 6. The stop 41 has a downwardly open notch 42 aligned with the passage 13 and defined by the depending portions 43. The width of the slot is so chosen that a predetermined and accurately die formed portion of the blank engages the portions 43 and stops the blank at the proper position for shearing, any slight error in length or shortness thus falling at the leading extremity of the blank.

In operation of the apparatus, a length of heated bar stock of uniform cross sectional shape and size or a heated length which has been formed partially into a series of connected irregularly contoured blanks is inserted, in heated state, by the workman through the passage 13 until it engages the stop 17, or stop 41, as the case may be. The blank is held while in this condition in the proper rotated position, which, in the case of a preformed irregularly contoured blank is a position in which, were it passed between the rolls 1 and 2, would cause the applied pressure of the rolls to be angularly disposed to, and preferably ninety degrees to the direction of application of, the forming pressure by which the bar stock had imparted to it its first irregular contour. While held in this position, it is severed by the shear 15 and the severed blank drops downwardly in the trough 11, being guided during its fall by the guides 22, if it is irregularly contoured, and finally coming to rest in the bottom of the trough 11 where it is constrained to the relatively rotated position in which it was held while being sheared off.

While the blank is so constrained from rotation within the trough 11, it is engaged by the push rod 21 and moved longitudinally of the trough toward the rolls. Since the operation of the push rod is adjusted accurately in relation to the rotation and position of the rolls, the blank may be pushed by the rod 21 between the rolls in proper registry with the dies, and just as the cavities come to the proper position, or, if desired, the blank may be pushed by the rod 21 into a predetermined position such that it is ready to be grasped by the rolls and pulled therebetween when the rolls reach the proper rotated position, the actual entry of the blank being effected by the rolls themselves. In either event, the blank is caused to enter the rolls in accurate registry with the die cavities. Thereupon, it is engaged and forged by the dies.

When plain bar stock is to be formed, the guides such as 22 may be removed. The operator continues to urge the bar stock or series of connected blanks through the passage 13 and the operations are repeated successively.

The method, part of which, so far as concerns irregular connected blanks, is thus carried out by the apparatus described, is best illustrated in Figs. 7 to 15, inclusive. Referring to Fig. 7, a length of bar or rod stock S which is rectangular in cross section is shown as passing through a pair of the usual die forging rolls with its longer cross-sectional dimension disposed vertically. It issues as a series of connected blanks having alternate flattened portions 44 and vertically thicker portions 45, the vertically thicker portions 45 providing greater width at locations where it may be desired in the final article. Thus the blank is irregularly contoured, that is, its cross section at all portions along its length is not the same size or shape. The series of connected blanks is next inserted through the passage 13 into the present apparatus. The predetermined accurately contoured portion of the first blank in the series engages the portions 43 of the stop 41 and gauges for cut-off. The series of blanks are held in the passage 13 in a position in which they are rotated ninety degrees about their axis from the position illustrated in Figs. 7 to 9, and thus are rotated ninety degrees about their axis from the direction of application of the pressure by which they were given their first irregular contour. While held in this relatively rotated position and gauged by the stop 41, the length disposed between the stop 41 and the inner face of the plate 12 is severed by the shear 15 and drops to the bottom of the trough 11 while held in this same relatively rotated position in which it was severed. Thereupon, it is engaged by the push rod 21 and caused to enter between the forging rolls 1 and 2. It will be noted in the first forging operation, the portions 44 were considerably wider than the portions 45 laterally of the blank in the position illustrated in Fig. 7. As a result of the second forging operation, these relatively wide portions 45 which are now disposed with their longer cross-sectional dimension vertically, are greatly reduced in cross section in both dimensions, the excess metal being drawn into length so that the portions indicated at 46 in Fig. 10 between the portions 44 are longer than they were after the first forging operation and more nearly approach in size and shape the corresponding portion of the finished article to be formed therefrom.

The blank thus illustratively shown is for the purpose of forming a pair of wrenches, such as indicated at 47 in Fig. 13. Thus more metal is provided for the enlarged and thick ends 48 of the wrenches than for the connected portions 49 thereof and this material is predistributed along the blank more nearly in proportion to the cavities of the final impression die than they were in the first forming operation.

The elongation due to drawing of the metal in the second roll forging operation and resultant reduction of the cross section of the portions 49 could not have been as effectively obtained by the impression die pressing or forging. The blank resulting from the second forging operation is next placed in a suitable impression forging or pressing die, such as indicated at 50, and which, for purposes of illustration, is shown as operated by a suitable drop hammer 51, and forged into final shape. As a result of this preconfiguration of the previously irregularly configured or contoured blank, efficient filling of all portions of the die cavity is obtained, and the loss in flash metal, indicated at 52, is reduced. The flash resulting in the last forging operation is more uniformly distributed around the periphery of the wrenches 47 and is much less than would be present were the blank resulting from the first die rolling operation placed directly in the impression dies and finally formed.

As a result of the use of the method and apparatus herein shown and described, the blank can be forged without reheating between the roll forging operation and the final impression die pressing or forging operation. As is customary after the final forming operation, the flash is removed in the well known manner.

In the method and apparatus hereinbefore described and in the claims appended hereto, the word "blank" is to be construed not only to mean a blank or length of bar stock sufficient for forming a single article, but also is to be construed to mean a blank or length of stock sufficient for forming two or more connected articles, as illustrated in Fig. 12, or any number of connected articles which are to be formed in a single impression die forging or pressing operation. By "irregularly contoured" is meant that the blank is not of the same size or shape of cross section at all portions along its length, and may or may not be symmetrical at all cross sections with respect to its longitudinal axis. Bar stock is meant to include stock of such total length that portions are to be cut off and then forged by the roll forging operation herein described, and applies whether the bar stock is plain or has been irregularly contoured to form a series of connected blanks before being subjected to the cutting off and forging operations herein described.

Having thus described my invention, I claim:

1. In a cut-off, feed, and roll forging die combination including rotatable cooperating forging roll dies defining a forging throat therebetween, a shear in fixed position materially in front of the dies and above the level of the throat and operable to cut off lengths of stock successively while the stock is in a position spaced in front of the dies, a feed table for receiving the cut-off lengths of the stock, by gravity, from the shear and for supporting them in a position in front of and for entry into the throat, a reciprocable feed device operative when driven for moving the cut-off lengths of stock successively from said position on the table, along the table and into the forging throat, a cam rotatable in fixed relation to one of the dies, a spring yieldably driving the feed device on its feeding stroke, and means operatively connecting the cam and feed device for moving the feed device by the cam on its return stroke and controlling the movement of the feed device by the spring on the feed stroke of the device.

2. In a cut-off, feed, and roll forging mechanism in which accurate feeding of a workpiece between the roll forging dies is required, a shear driven in fixed timed relation to the forging rolls, a table positioned below the level of the shear for receiving workpieces cut off by the shear upon the workpieces dropping by gravity, said table having a portion extending in close proximity to the forging throat formed by the dies for supporting the cut-off workpieces as they are pushed into the throat, a push rod reciprocable along the table to push the cut-off workpieces into the throat, a spring urging the push rod in the feeding direction, a cam driven in timed relation to the roll forging dies and operatively connected to the push rod for moving the push rod in a return direction against the force of the spring and for controlling the movement of the push rod by the spring in the feeding direction in accurately timed relation to the dies.

3. In a cut-off, feed, and roll forging mechanism in which accurate feeding of a workpiece between the roll forging dies is required, a shear driven in fixed timed relation to the forging rolls, a table positioned below the level of the shear for receiving workpieces cut off by the shear upon the workpieces dropping by gravity, said table having a portion extending in close proximity to the forging throat formed by the dies for supporting the cut-off workpieces as they are pushed into the throat, a bell crank, a push rod connected to one arm thereof and reciprocable thereby along the table to push the cut-off workpieces into the throat, a spring urging the bell crank in a direction to cause the push rod to move on its feeding stroke, a cam operatively connected to the roll forging dies and to the other arm of the bell crank for operating the bell crank against the force of the spring on a return stroke and for controlling the movement of the bell crank by the spring on the feed stroke.

4. In a device for cutting off irregularly externally pre-contoured blanks from a connected series of such blanks, successively, a shear, a stop shaped and positioned to engage, in turn, a predetermined externally contoured portion of each leading blank of the series for stopping movement of the series of connected blanks in the feeding direction at the proper position for cutting off the leading blank while permitting passage of the leading cut end of the leading blank and such other parts of the leading blanks as are in advance of said predetermined contoured portion, whereby any errors in the length of the blanks in the series are prevented from becoming accumulative, a work forming mechanism, a table below the shear for receiving the cut-off pre-contoured blanks and having a portion extending in close proximity to the work-forming mechanism, to which the blanks are to be fed, for supporting the cut-off blanks in a position in which they may be pushed into the mechanism, guides interposed between the table and shear for receiving each cut-off blank, in turn, and for guiding the blank to an accurate position on the table while constraining it from rotation about its axis, a push rod operable to engage and push the cut-off blanks successively into the mechanism while the cut-off blanks are supported on the table, and means driven in timed relation to the work forming mechanism and shear for operating the push rod.

WILLIAM W. CRILEY.